United States Patent [19]

Bertels

[11] Patent Number: 4,550,259
[45] Date of Patent: Oct. 29, 1985

[54] DEVICE FOR CONVERTING WIND ENERGY INTO ANOTHER FORM OF ENERGY

[75] Inventor: Augustinus W. M. Bertels, Arnhem, Netherlands

[73] Assignee: Transinvest B.V., Almere, Netherlands

[21] Appl. No.: 515,524

[22] Filed: Jul. 20, 1983

[30] Foreign Application Priority Data

Jul. 28, 1982 [NL] Netherlands .......................... 8203019

[51] Int. Cl.⁴ ............................................. F04D 29/38
[52] U.S. Cl. ........................................ 290/55; 290/44; 416/228
[58] Field of Search ...................... 290/44, 55; 416/11, 416/120, 243, 228, DIG. 5, 23

[56] References Cited

U.S. PATENT DOCUMENTS

| 527,738 | 10/1894 | Touzelin | 416/120 |
| 644,102 | 2/1900 | Sedgewick | 416/11 |
| 2,014,032 | 9/1935 | Sharpe et al. | 416/228 |
| 2,160,467 | 5/1939 | Ward | 416/228 |
| 2,714,499 | 8/1955 | Warner | 416/243 |
| 3,416,725 | 12/1968 | Bohanon | 416/228 |
| 4,035,658 | 7/1977 | Diggs | 416/11 |
| 4,063,852 | 12/1977 | O'Connor | 416/228 |
| 4,331,881 | 5/1982 | Soderholm et al. | 290/44 |

FOREIGN PATENT DOCUMENTS

| 672606 | 3/1939 | Fed. Rep. of Germany . |
| 742242 | 10/1943 | Fed. Rep. of Germany . |
| 2908761 | 9/1980 | Fed. Rep. of Germany . |
| 2436007 | 4/1980 | France . |
| 775816 | 5/1957 | United Kingdom . |

*Primary Examiner*—William M. Shoop, Jr.
*Assistant Examiner*—W. E. Duncanson, Jr.
*Attorney, Agent, or Firm*—Diller, Ramik & Wight

[57] ABSTRACT

The invention relates to a device for converting wind energy into another form of energy comprising a plurality of propellers having equidirectional shafts, being arranged in a matrix and driving associated energy converters.

The invention generally proposes to design a device of the kind set forth in a manner such that the occupation density is at least 0.4 propellers per square meter. By this step a device is obtained, whose propellers are so small that the profile can satisfy an ideal profile with great accuracy without excessive increase in production costs. Furthermore, the number of revolutions during normal operation may be very appreciably higher than that of a known device so that the device only produces hardly troublesome, rustling noise, the level of which depends on wind force and thrust loads do no longer occur.

14 Claims, 17 Drawing Figures

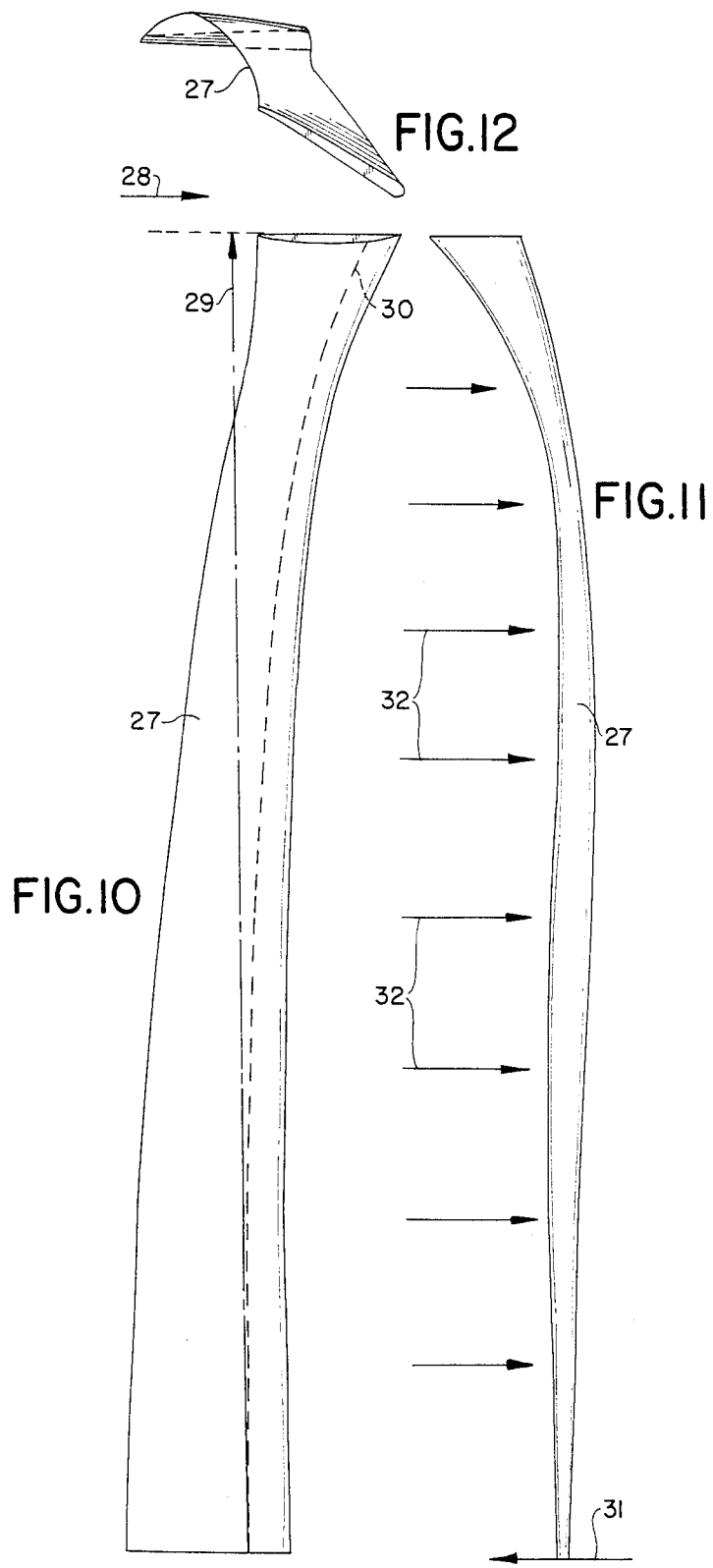

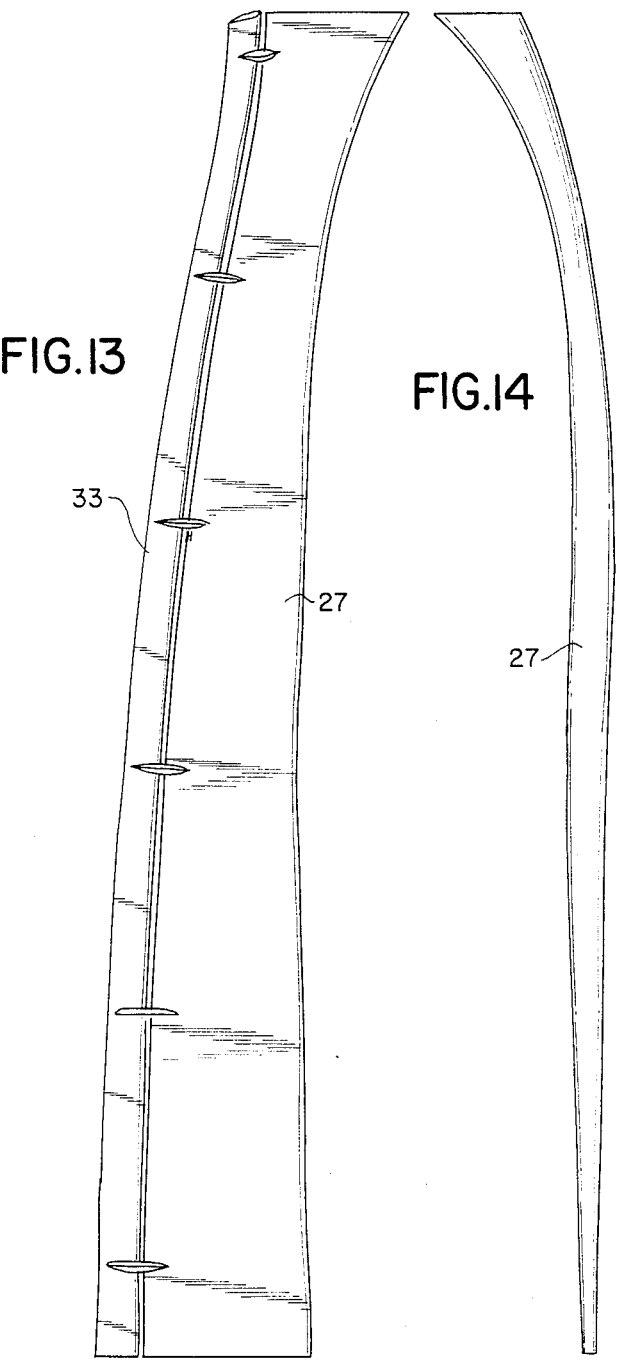

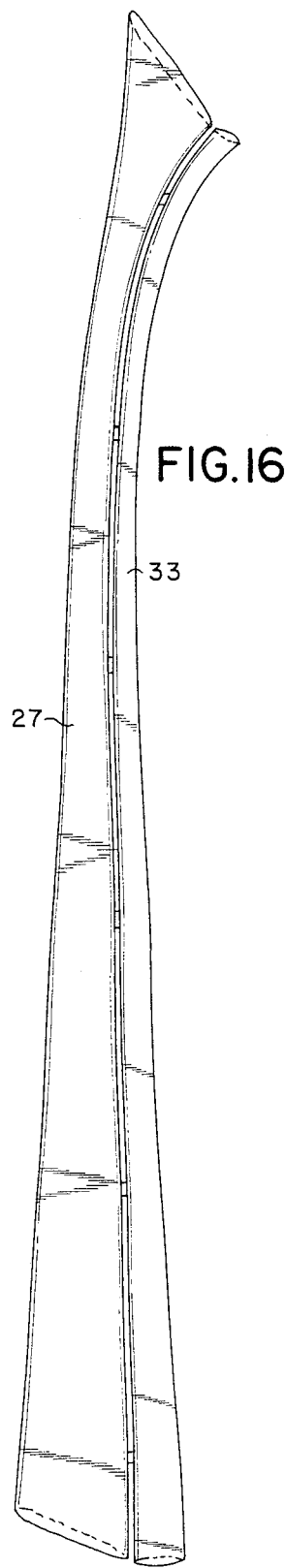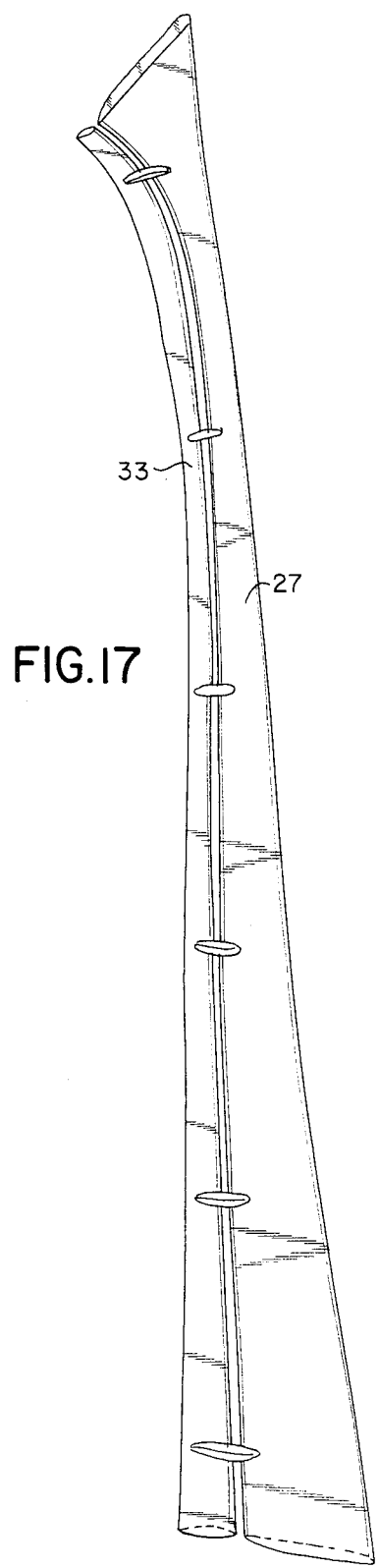

DEVICE FOR CONVERTING WIND ENERGY INTO ANOTHER FORM OF ENERGY

The invention relates to a device for converting wind energy into another form of energy comprising a plurality of propellers having equidirectional shafts, being arranged in a matrix and driving associated energy converters.

Such a device is known. The known device comprises a plurality of propellers having a radius of the order of magnitude of 7 meters. The use of such long propeller blades, either for a single propeller or a plurality of matrix-arrayed propellers brings about a number of disadvantages.

In the first place the weight of the blades increases with the product of the cross-sectional area and the length (radius), that is to say, generally by the third power of the radius. The heavy weight of the known rotors brings about a heavy mechanical load of the carrying construction. Resonance phenomena are of frequent occurrence and can be suppressed only with difficulty and may lead to metal fatigue and breakdown of structural parts, which involves hazards for the surroundings. It is not an imaginary risk for one or more propeller blades to break off and fly around with high speed, which may result in damage and injury to those standing by.

The conventional systems, moreover, require vane setting for a start so that the construction of the known systems is complicated. Only at a wind speed of about 4 ms/sec. a self-starting effect is obtained.

For a satisfactory degree of efficiency a complicated profile is necessary, which involves accurate and expensive manufacture. For larger blades the theoretically required torsion or twist is even so high that it cannot be technically obtained. Therefore, in practice a compromise is chosen with respect to the optimum angle of incidence of the wind.

Known systems are furthermore necessarily provided with means for turning the propellers out of the wind in order to protect the device against excessive wind speeds.

Since the prior art, large devices are operating with low angular speed, it is necessary, for example for driving an electric generator to use a transmission raising the number of revolutions, for example, a gear box. This brings about a considerable loss of available power, whilst the transmission constitutes a potential source of disturbances.

The mass to be carried by the carrying construction, generally a high mast, comprises the propellers, the device(s) for adjusting the vane position, the gear wheel transmission and usually a mechanical brake device for safety purposes. Obviously the overall mass to be supported by the carrying construction is very large. As stated above, this may technically be a considerable disadvantage.

Since a large number of heavy blades can be set only with difficulty, unless heavy, sophisticated, expensive setting systems are employed, the large propellers are always provided with only two or three blades. To give an idea, it is noted that for high powers blades having a radius of about 90 meters have been proposed.

Due to the relatively low angular speed noise is emitted shock-wise. Moreover, the carrying mast is intermittently loaded by thrusts, whilst the winds are exposed to a shockwise varying load when passing by the mast.

With regard to the compromises summarily stated above it is found in practice that usually maximum power coefficients (the power coefficient $c_p$ is the standardized power related to the efficiency of the device) of about 0.25 on an average can be obtained throughout a year. This value is far below the theoretically and technically attainable value. A higher value of, for example 0.5 can be attained with the conventional devices only by very expensive and hence economically not interesting solutions.

The invention has for its object to provide a solution for the above-mentioned problems of the known technology and to obviate the limitations inherent thereto. In this respect the invention generally proposes to design a device of the kind set forth in a manner such that the occupation density is at least 0.4 propellers per square meter. By this step a device is obtained, whose propellers are so small that the profile can satisfy an ideal profile with great accuracy without excessive increase in production costs. Furthermore, the number of revolutions during normal operation may be very appreciably higher than that of a known device so that the device only produces hardly troublesome, rustling noise, the level of which depends on wind force and thrust loads do no longer occur.

Preferably the effective, specific mass of the propellers is lower than 2500 kgs/m$^3$.

The propellers can advantageously be made by casting, more particularly by spray-casting a material containing a synthetic resin.

In a device, the propellers of which are in common rotatable about a vertical axis, it is advantageous for the direction of rotation of one half number of propellers to be opposite that of the other half number of propellers. It is in this way avoided that due to the gyro-moment of the overall device such a large spacial stability should be obtained that the device could match varying directions of the wind only with difficulty.

A very great flexibility is obtained by the variant which is characterized in that near the rear rim of each propeller blade at least one additional blade is arranged to obtain an enlarged, maximum angle of incidence with respect to the local direction of the wind.

It is advantageous to use measuring means for measuring the wind velocity and control-means governed by said measuring means for controlling the ratio between the tip speed of the propeller blades and the undisturbed wind velocity, that is to say, the wind velocity at a given distance from the driven propellers.

Needless to say that there is a tendency to obtain a maximum energy yield. The couple on each propeller blade should be as high as possible. For this purpose it is necessary to produce a maximum overall lift moment, whilst the braking moment is at a minimum as a result of the resistance. The lift is expressed by the so-called lift coefficient $c_l$ and the resistance is expressed by the resistance coefficient $c_d$. The purpose is to obtain a maximum lift without loss of achievement represented by the quotient $c_l/c_d$.

According to the invention the above-mentioned purpose is obtained by means of a device characterized in that of each propeller blade the blade axis, that is to say, the locus of the points lying on a quarter of the profile chords is increasingly inclined in the direction towards the free blade end with the direction of rotation and that in the direction towards the free blade end, in the direction of the rotary axis, the blade axis is inclined in the direction of the incident wind. In this respect it is advantageous to use a variant in which of each propeller blade the chord length decreases away from the centre of rotation over at least a predetermined axial distance. It has been found that a further improvement in energy yield is obtained by a design having the particular feature that of each propeller blade the chord length increases away from a preselected point of the blade axis in the direction towards the free blade end, said point being located between about 0.7 and 0.9-times the axial length from the end of the propeller blade end directed towards the centre of rotation.

The invention will be described more fully with reference to a drawing in which

Figure 3:
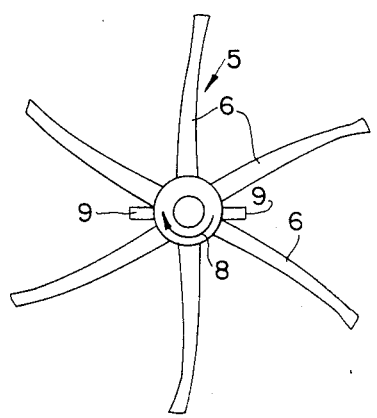
FIG. 3 is a front view of a propeller.
Figure 4:
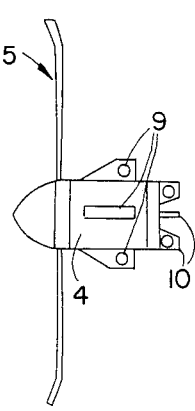
Figure 7:
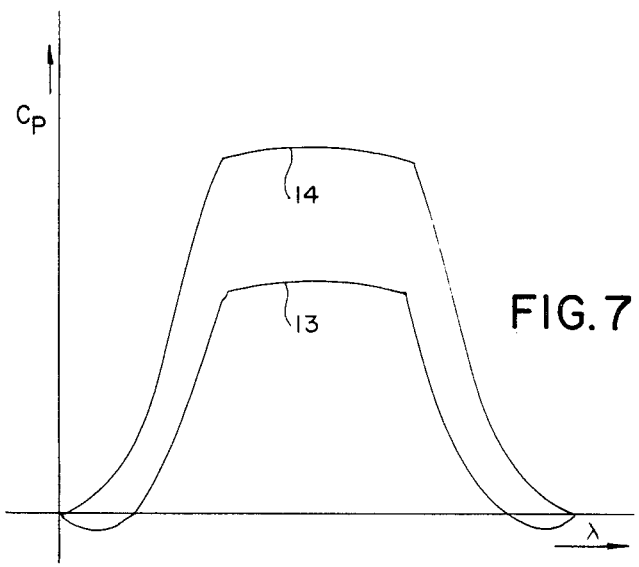
Figure 5:
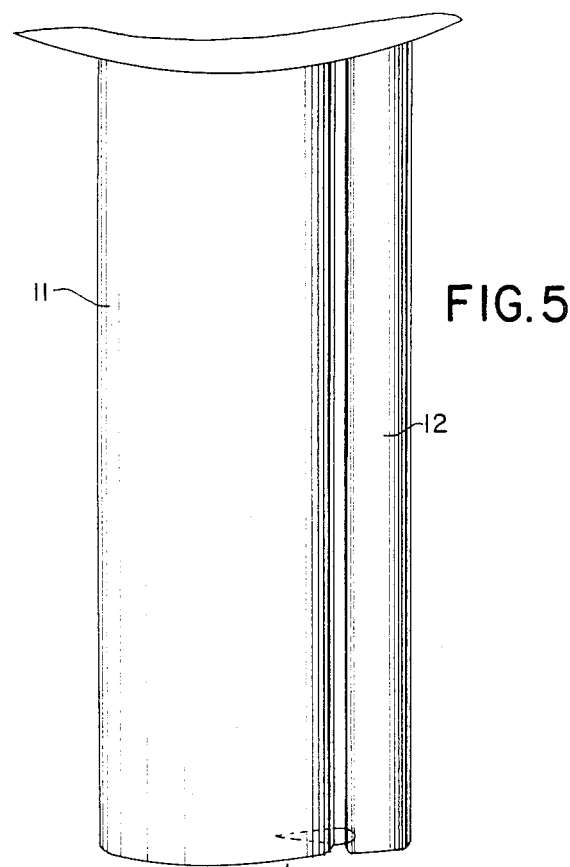
Figure 6:
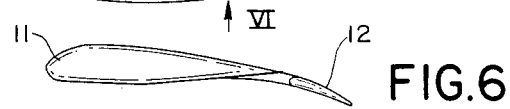
Figure 8:
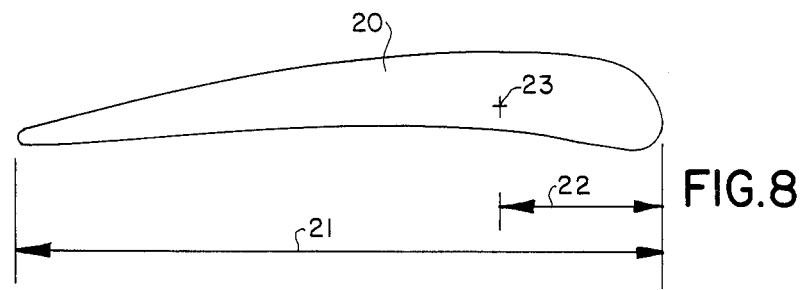
Figure 9:
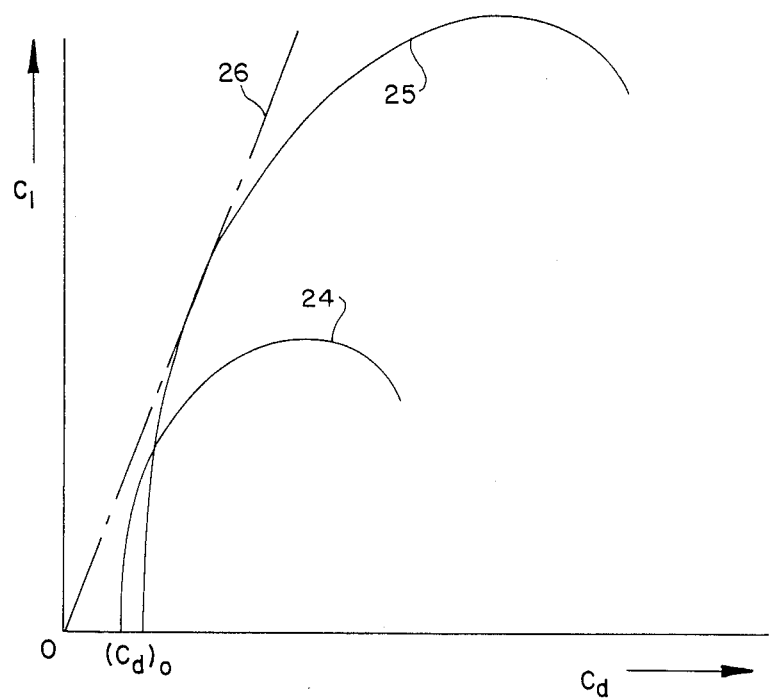

FIG. 4 is a side elevation of the propeller of FIG. 3, which is directly coupled with an electric generator, FIG. 5 is a front view of a propeller blade having one additional blade, FIG. 6 is an elevational view in the direction of length of the propeller blade shown in FIG. 5, FIG. 7 is a graph of some important properties of a device embodying the invention compared with those of the prior art, FIG. 8 is a cross-sectional view of a propeller blade, FIG. 9 is a graph for explaining the blade construction embodying the invention, FIG. 10 is a front view of a propeller blade embodying the invention, FIG. 11 is a side elevation thereof, FIG. 12 is a perspective view away from the root of a blade, FIG. 13 is an elevational view corresponding to FIG. 10 of a blade with an additional blade, FIG. 14 is an elevational view corresponding to FIG. 11 of the blade shown in FIG. 13, FIG. 15 is an elevational view corresponding to FIG 12 of the blade shown in FIG. 13, FIG. 16 is a perspective view of one side of the blade of FIG. 13, and FIG. 17 is a perspective view from the other side of the blade shown in FIG. 13.

Figure 1:
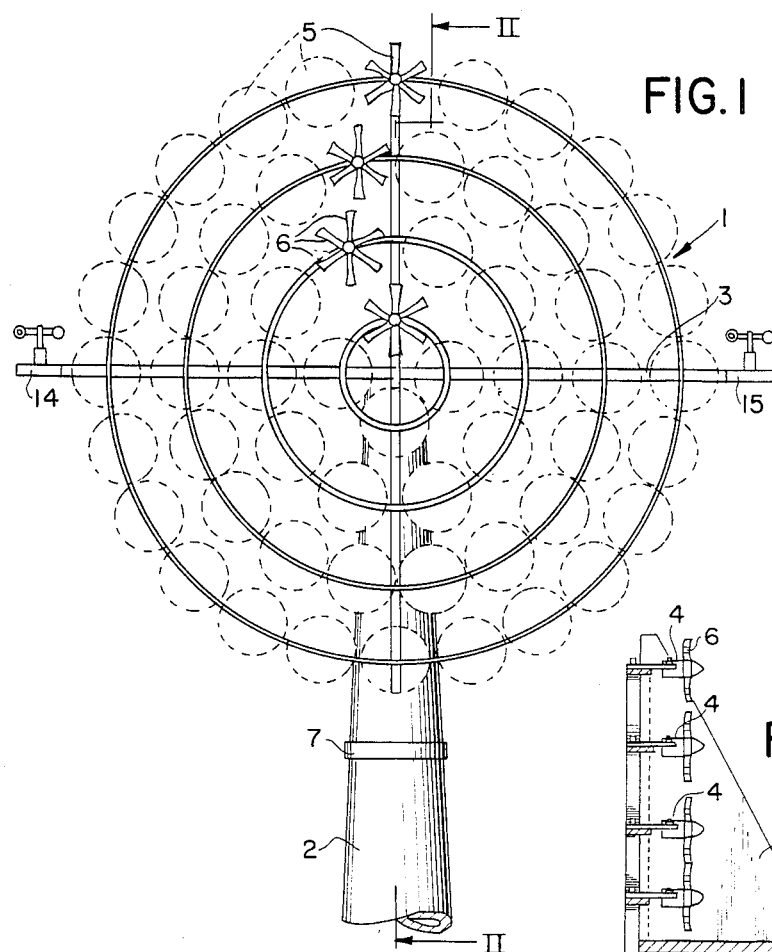
FIG. 1 is a front view of a device embodying the invention.
Figure 2:
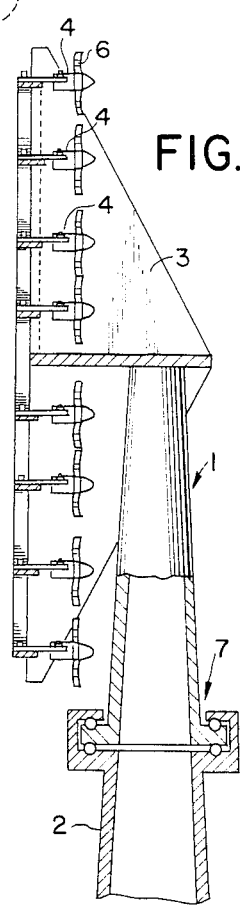
FIG. 2 is a side elevation of the device of FIG. 1.

FIG. 1 shows a device 1 embodying the invention. This device comprises a carrying pole 2, to which a frame 3 is fastened, which carries a number of electric generators 4 (see FIG. 2) which are driven by propellers 5 having each six blades 6.

The frame 3 is carried by the pole through a bearing 7. From FIG. 2 it is apparent that the propellers 5 are located behind the rotary axis of the frame 3 on the pole 2 so that the propellers always set themselves to the wind. On both sides of the propeller field the frame 3 is furthermore provided with two anemometers 14,15, which produce equal signals at the reception of the same wind speeds. If inadvertently the self-setting effect of the device has failed, one of the two anemometers will have a lower number of revolutions due to the abating effect of the device and will therefor produce a lower signal. The difference between the two signals can serve as a control-signal for correcting the position of the frame 3 by means (not shown) and/or for adapting the fast-running coefficient of the propellers in the manner to be described hereinafter with reference to FIG. 7.

The drawing does not show means for coupling the generators 4 and for giving off their energy to a consumer circuit, as the case may be, in conjunction with storing means such as accumulators or the like.

FIG. 3 shows a propeller 5. The direction of rotation is indicated by the arrow 8.

FIG. 4 shows a generator 4 with the propeller 5. FIGS. 3 and 4 furthermore show the presence of fastening elements 9, 10 to fasten the generator 4 with the propeller 5 to the frame 3.

The cross-sectional profile of the blades 6 is adapted to a given range of tip speed ratio, also termed herein the fast-running ratio, that is to say, the ratio between the tip speed of the blades and the effective wind velocity. It is noted that in a very simple and cheap embodiment a commercially available car dynamo may be employed, with which is coupled a car ventilator for driving purposes. It will be obvious, however, that an aerodynamically well designed profile will produce an improved effect.

FIGS. 5 and 6 show a propeller blade 11, near the rear rim of which there is arranged an additional, relatively small blade 12. Such a configuration may serve to enlarge the maximum angle of incidence of the wind.

FIG. 7 shows an achievement graph of the device embodying the invention and, by way of comparison, that of a prior art device. On the ordinate is plotted the power coefficient $c_p$. This power coefficient is a standardized power, that is to say a power made dimensionless. On the abscissa is plotted the aforesaid tip speed ratio $\lambda$. Thereto applies:

$$\lambda = \frac{\Omega R}{U},$$

wherein
$\Omega$ = number of revolutions expressed in Rad/s$^{-1}$
R = radius of the propeller expressed in m, and
U = the wind velocity expressed in ms$^{-1}$.

The curve 13 is the achievement graph of a conventional device. As stated above, the design of the propeller blades is an aerodynamic compromise. The twist should not be too large. Frequently the tapering shape (the course of the chord) is a first-order or lineair approach. The blades are located on the wing shaft on one quarter of the chord. The wing axis is a straight line, whereas it has to describe a spacial curve. Therefore, the maximum power coefficient can attain only a limited value. At a very small tip speed ratio $\lambda$ (starting) even a release of the wind stream occurs as a result of the maximum attainable lift coefficient. The stream does not follow the blade profile.

The curve 14, the achievement graph of a device embodying the invention, shows an appreciably increased value of the power coefficient, whilst in contrast to the curve 13, the power coefficient does not become negative for any tip speed ratio.

In order to ensure that even with highly different values of the wind velocity the power coefficient $c_p$ has a maximum value, a control proportional to the incoming wind velocity may be carried out on the generators 4. Such a control may be a combination of a speed control with a power control.

FIG. 8 is a cross-sectional view of a propeller blade 20. The arrow 21 indicates the length of the chord, that is to say, the distance between the foremost and the hindmost points of the blade profile. At a quarter thereof from the front edge as indicated by an arrow 22 is located a point 23, which is a point of the so-called blade axis.

FIG. 9 shows two graphs 24 and 25. Horizontally is plotted the resistance coefficient $c_d$. Vertically is plotted the lift coefficient $c_l$. The curve 24 corresponds to a wing profile without additional blade near the rear edge. The curve 25 is a corresponding graphical representation for the case in which the wing profile is provided with an additional blade. A tangential line 26 from the zero point of the co-ordinate system indicates, as will be apparent, the maximum ratio $c_l/c_d$.

FIG. 10 is a front view of a propeller blade 26. The direction of rotation is indicated by the arrow 28. The radius is designated by 29. It is apparent that the blade axis 30, that is to say, the locus of the points located on a quarter of the profile chords is increasingly sloping in the direction towards the free blade end with the direction of rotation. FIG. 10 furthermore shows that the chord length away from the centre of rotation initially decreases and again increases beyond a point at about 0.8 times the axial length.

FIG. 11 illustrates that the blade axis is sloping in the direction of the incoming wind in the direction of the rotary axis designated by reference numeral 3'. The incoming wind is indicated by arrows 32.

FIG. 12 shows that the profile in general is torsioned.

FIG. 13 to FIG. 17 show various elevational views, FIGS. 13 to 15 corresponding with FIGS. 10 to 12 of a variant which differs from the embodiment shown in FIGS. 10 to 12 only in a sense such that an additional blade 33 is arranged at the rear rim of the propeller blade In general it should be noted that the construction in which the blade axis of each propeller blade is sloping with the direction of rotation in the direction towards the free blade end may be denoted by the term "foreswoop". This foreswoop is proportioned so that the exit angle of the boundary layer in the direction towards the free blade end or the tip is mainly compensated for.

It should be noted that in accordance with the invention no blade setting is carried, but that local wind directions and hence flow patterns are used, since preferably the speed of rotation is coupled with the wind velocity in conformity to the description with reference to FIG. 7. In this connection it is emphasized that a known construction as described in German Patent Application DOS No. 2,908,761 is useless in this respect. According to this known technology maximum power output cannot be attained since the blade geometry will be suitable for only one combination of wind velocity/speed of rotation.

The invention is not limited to the embodiments described. Reference is made, for example, to the possibility of driving one electric generator by a plurality of propellers, for example, by using a planet wheel transmission or a driving belt.

In order to maximize the power coefficient in converting wind energy into mechanical energy there may be used a friction body controlled by the anemometers. As an alternative, a known centrifugal control may be employed. In such a mechanical system the transfer from the energy converters to the storing member or the consumer station may take place through a heat pipe.

What I claim is:

1. A device for converting wind energy to mechanical energy, which comprises a rotatable driving shaft adapted to provide energy output, a propeller having a plurality of blades radiating from said shaft, each blade being of airfoil shape in cross section to define a rounded leading edge and a tapered trailing edge, each blade having an axis defined by the locii of points lying at the one quarter points of the chords of the airfoil which axis is curved from the root of the blade toward the tip in the direction of rotation, and the tip portion of each blade being displaced outwardly from the general plane of rotation in the direction of incident wind and said propeller having a power coefficient which does not become negative for any ratio $\lambda = \Omega R/V$ where $\Omega$ is the angular velocity of the propeller expressed in radians per second, R is the radius of the propeller in meters, and V is the wind velocity in meters per second.

2. A device as claimed in claim 1 wherein the effective specific mass of the propeller is smaller than 2500 kgs/m$^3$.

3. A device as claimed in claim 1 including measuring means for measuring wind velocity and angular velocity of the propeller and control means governed by said measuring means for controlling the ratio $\lambda$.

4. A device as claimed in claim 3 wherein said control means comprises a generator, driven by said propeller, with a variable power control to impose a variable load on the propeller.

5. A device as defined in claim 1 including at least one additional blade arranged along the trailing edge of at least one of said propeller blades to obtain an enlarged maximum angle of incidence with respect to local wind direction.

6. A device as claimed in claim 5 in which the propellers are in common rotatable about a vertical axis characterized in that the direction of rotation of one half number of propellers is opposite that of the other half number of propellers.

7. A device as defined in any one of claims 1-5 wherein along a portion of each blade from the center of rotation the chord length decreases.

8. A device as defined in claim 7 wherein the chord length of each propeller blade decreases from the center of rotation to a point located between about 0.7 and 0.9 times the axial length from the center of rotation and thereafter increases in the direction of the free blade end.

9. A device as defined in claim 8 wherein the propeller has a diameter less than about $\sqrt{2.5}$ meters and a low specific mass.

10. A device as defined in claim 9 wherein said specific mass is less than 2,500 kg per cubic meter.

11. A device as defined in claim 10 wherein the propeller is formed of synthetic resin.

12. A device as defined in claim 11 wherein there are a plurality of said propellers disposed in an array thereof, the occupation density of said propellers being at least 0.4 propellers per square meter.

13. A device as defined in claim 12 wherein said array is rotatable about a vertical axis and said propellers are arranged to front the wind from a position located behind said vertical axis.

14. A device as defined in claim 13 wherein the direction of rotation of one half of the number of propellers is opposite to that of the other half.

* * * * *